United States Patent [19]
Naito et al.

[11] Patent Number: 4,493,068
[45] Date of Patent: Jan. 8, 1985

[54] PICK-UP POINT DISLOCATION DETECTING DEVICE IN RECORDING A DISC PLAYER

[75] Inventors: Ryuichi Naito; Hiroyuki Hirano, both of Tokorozawa, Japan

[73] Assignee: Pioneer Electronic Corporation, Tokyo, Japan

[21] Appl. No.: 398,218

[22] Filed: Jul. 14, 1982

[30] Foreign Application Priority Data

Jul. 15, 1981 [JP] Japan .......................... 56-105247[U]

[51] Int. Cl.³ ........................ G11B 21/10; H04N 5/76
[52] U.S. Cl. ...................................... 369/44; 250/201
[58] Field of Search .................. 358/342; 250/201; 369/43, 44, 46, 47

[56] References Cited

U.S. PATENT DOCUMENTS

| | | | |
|---|---|---|---|
| 4,232,337 | 11/1980 | Winslow et al. | 369/44 |
| 4,359,635 | 11/1982 | Gross | 369/44 X |
| 4,406,000 | 9/1983 | Shoji et al. | 369/44 |

Primary Examiner—Robert L. Richardson
Attorney, Agent, or Firm—Fleit, Jacobson, Cohn & Price

[57] ABSTRACT

A pick-up point dislocation detecting device for detecting dislocation of a pick-up point of pick-up means in a disc player. The pick-up point is dislocated from a recorded region of a recording disc being played back on the disc player. The dislocation detecting device compares the signal level of an electric signal obtained from the pick-up means with a reference level. The reference signal corresponds to the signal level of the electric signal when the pick-up point is located within an intervening region between two neighboring tracks on the recording disc. The dislocation detecting device produces a dislocation detection signal when the signal level of the obtained electric signal falls below the reference level.

9 Claims, 18 Drawing Figures

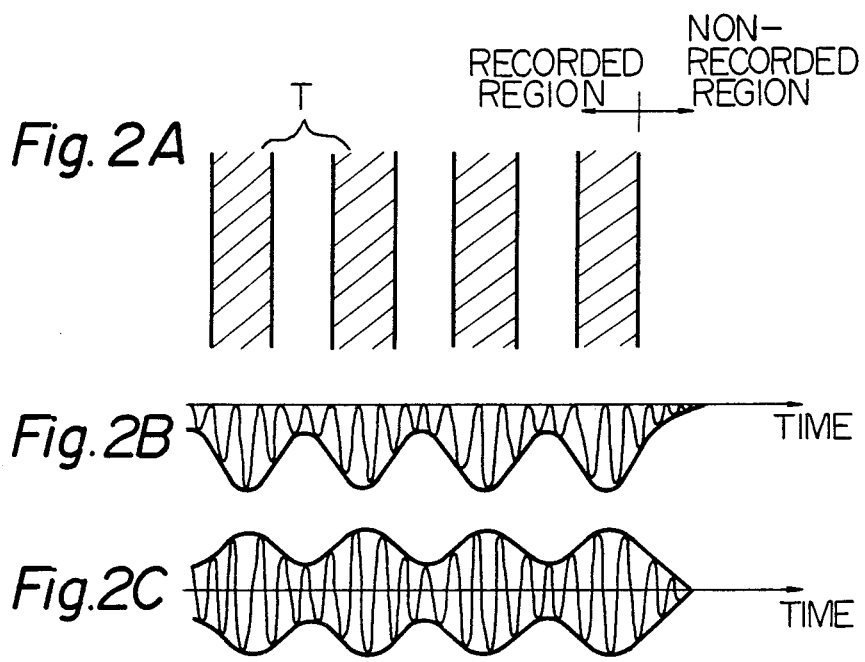
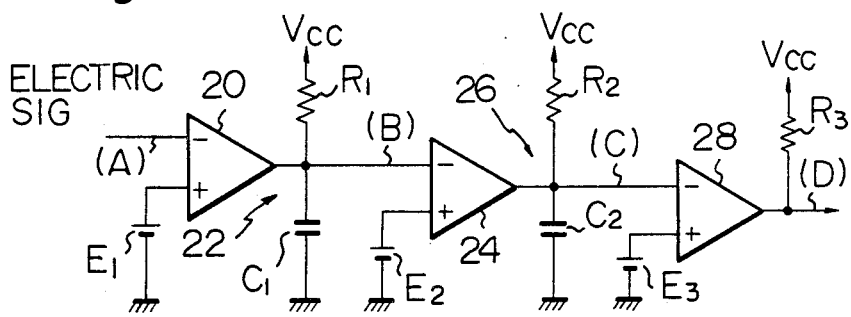

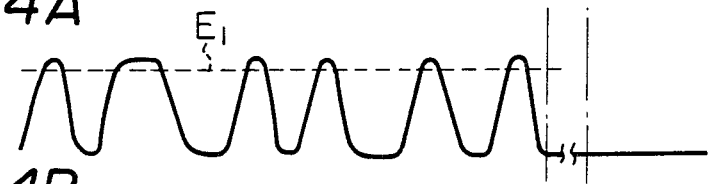
Fig. 4A
Fig. 4B
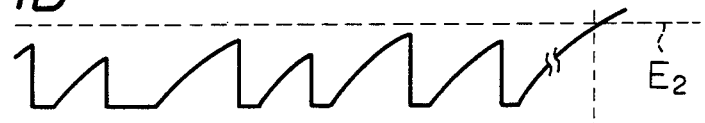
Fig. 4C
Fig. 4D

Fig. 6
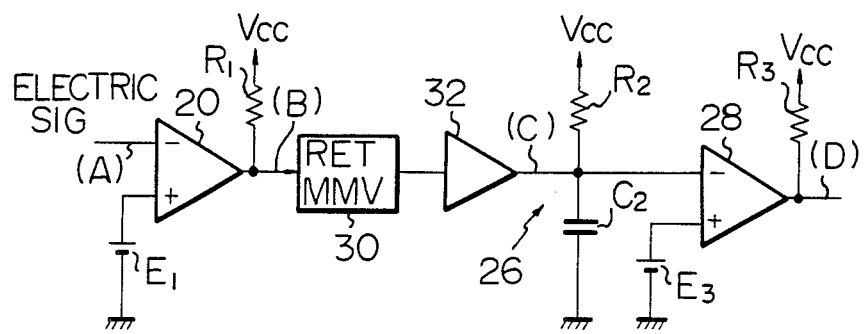
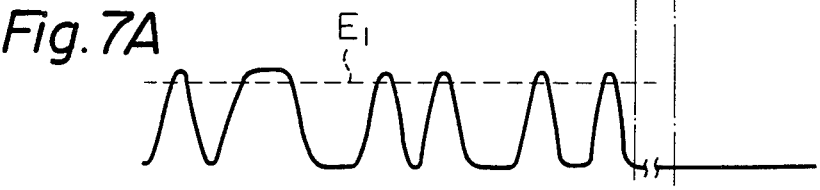
Fig. 7A
Fig. 7B
Fig. 7C
Fig. 7D
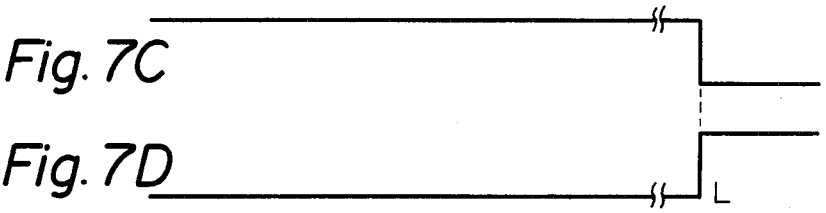

PICK-UP POINT DISLOCATION DETECTING DEVICE IN RECORDING A DISC PLAYER

FIELD OF THE INVENTION

The present invention relates to a recording disc player and, in particular, to a detection device for detecting dislocation of a pick-up point from a recorded region of a recording disc being played in the recording disc player.

BACKGROUND OF THE INVENTION

Being well known in the art, a recording disc player such as a digital audio disc player includes pick-up means which is positioned in the proximity of a recording surface of a recording disc being rotated at a certain speed on a turn-table. The pick-up means produces an electric signal containing therein a track signal previously recorded on the recording surface in the form of one or more annular or spiral, i.e. circumferentially extending tracks. The pick-up means produces a detecting point on the surface of the disc which point is to be aligned on to a target track from which the track signal is detected or read. Since the so-called tracking servo of the pick-up means directs the detecting point onto the target track by a tracking servo system which, in turn, is operative on the basis of an error signal representing amount and direction of deviation of the pick-up point from the target track, the pick-up point must be located within a recorded region which is defined between radially innermost and outermost tracks on the recording surface. It is to be understood that the tracking servo system does not operate when the pick-up point is located within a non-recorded region due to lack of usable electric signal from the pick-up means.

Since, however, the area or position of the recorded region on the recording surface of a recording disc is usually not definite or previously unknown, that is, different from disc to disc, the detecting point of the pick-up means in a recording disc player is subject to move or dislocate from the recorded region and enter the non-recorded region, with the result that the tracking servo system becomes inoperative due to lack of the electric signal from the pick-up means. The system is, therefore, required to quickly detect the removal or dislocation of the pick-up point from the recorded region during the pick-up operation and to return the pick-up point back to the recorded region.

SUMMARY OF THE INVENTION

It is accordingly a primary object of the present invention to provide a detection device for detecting the dislocation of the pick-up point of the pick-up means from a recorded region of a recording disc being played back in a recording disc player.

According to the present invention, there is provided a detection device for detecting dislocation of a pick-up point of pick-up means from a recorded region of a recording disc being played back in a disc player, said pick-up means being positioned in the proximity of a recording surface of said recording disc for producing an electric signal containing a track signal recorded on said recording surface in the form of one or more circumferentially extending tracks, said pick-up point being aligned on one of the tracks, which comprises:

first reference level establishing means for esbalishing a first reference level;

comparing means for comparing the intensity of said electric signal with said first reference level and for producing an output signal when the intensity of said electric signal falls below said first reference level; and timer means for producing a dislocation signal when said an output signal lasts longer than a first predetermined time period, said dislocation signal indicating dislocation of said pick-up point from said recorded region.

BRIEF DESCRIPTION OF THE DRAWINGS

FIGS. 2A through 2C are figures illustrating relation between an electric signal produced from the pick-up means and tracks on a recording disc;

FIG. 3 is a circuit diagram illustrating am embodiment of the present invention;

FIGS. 4A through 4D diagrams showing waveforms of signals appearing in the circuit of FIG. 3, when the pick-up point locates within a recorded region or nonrecorded region on the recording disc;

FIG. 6 is a circuit diagram showing another embodiment of the present invention; and FIGS. 7A through 7D are diagrams respectively illustrating waveforms of signals appearing in the circuit of FIG. 6, when the pick-up point locates within a recorded region or non-recorded region on the recording disc.

DETAILED DESCRIPTION OF EMBODIMENTS

Figure 1:
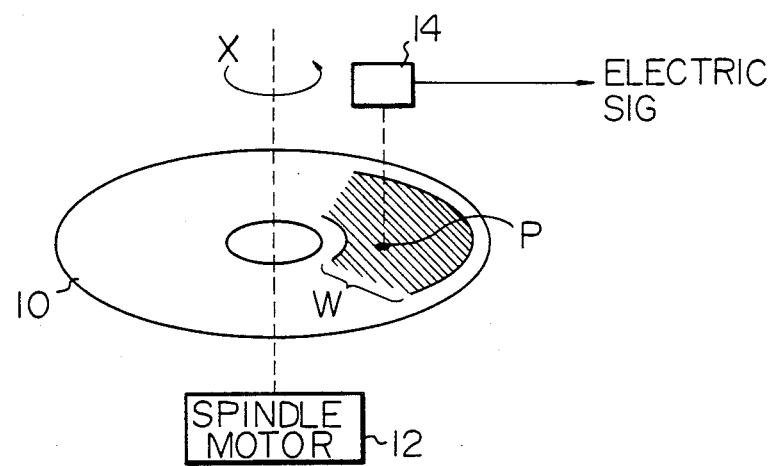
FIG. 1 is a block diagram roughly illustrating relationship between a recording disc to be played and pickup means provided in a disc player.

Referring now to the drawings, especially to FIG. 1, there is shown a recording disc 10 which is mounted on a turn-table to be rotated in a direction of X by a spindle motor 12 of a recording disc player. The recording disc may be a video disc, a digital audio disc, or the like which carries on the recording surface thereof audio and/or video information in the form of one or more annular or spiral tracks. The recording or playback operation of the recording disc may be performed optically, electrostatically or otherwise. It is usual that a recorded region in which the tracks reside has a limited area as shown by a reference letter W in FIG. 1. The information recorded on the recording surface of the recording disc 10 is read or picked up by means of a pick-up device 14 which produces an electric signal representative of a track signal obtained from a target track on which a pick-up point P of the pick-up device 14 is aligned under the usual tracking servo control.

As already mentioned above, the pick-up point P should locate within the recorded region W, in order to perform a preferred tracking servo operation or other servo controls.

In FIG. 2A, there is shown a portion of the recording surface of the recording disc 10 in an enlarged scale, wherein the tracks T, indicated in hatchings, are radially equidistantly and circumferentially extend so as to define a recorded region sandwiched by a radially innermost track and a radially outermost track. The remaining region of the recording surface other than the recorded region is referred to as a non-recorded region in this description.

FIG. 2B shows a waveform of the electric signal obtained from the pick-up device 14 in terms of time when the pick-up device performs the so-called scan mode of operation from the leftmost track to the rightmost track in FIG. 2A. FIG. 2C shows a waveform of the electric signal from which a dc component is eliminated.

It is apparent from FIGS. 2A and 2C that the electric signal obtained from the pick-up device 14 has a certain intensity or voltage level even when the pick-up point P locates within an intervening region between two neighbouring tracks on the recording surface due to the leakage component signals from the neighbouring tracks.

The present invention exploits the above-mentioned phenomenon in order to detect the location of the pick-up point within the non-recorded region. Namely, the detection device according to the present invention is adapted to detect the dislocation or deviation of the pick-up point from the recorded region when the electric signal has an intensity or level lower than a reference level corresponding to a predetermined minimum intensity of the electric signal when the pick-up point locates within the intervening region.

In FIG. 3, there is shown a detection device according to the present invention, which comprises a first comparator 20 adapted to compare an electric signal (A) produced from the pick-up device 14 with a first reference potential or level $E_1$ and to produce a discharge signal when the level or intensity of the electric signal exceeds the reference level $E_1$. The comparator 20 produces a charge signal when the intensity of the electric signal balls below or is lower than the reference level $E_1$. The comparator 20 is, in this embodiment, constituted to have the minus input terminal thereof kept at a potential $E_1$ and the plus input terminal thereof adapted to receive the electric signal. It is to be understood that the reference level $E_1$ is selected to be slightly lower than a preestimated or predetermined amplitude of the electric signal when the pick-up point is located within the intervening region. The comparator 20 preferably has an output stage of so-called "open collector construction".

The output terminal of the comparator 20 is connected to a charge-discharge circuit 22 which is, in this embodiment, constructed by a series connection of a resistor $R_1$ and a capacitor $C_1$ across which a voltage Vcc is applied. A voltage across the capacitor $C_1$, that is, an output voltage (B) of the charge-discharge circuit 22 is supplied to a minus input terminal of a second comparator 24. Another input terminal of the second comparator 24, that is, a plus input terminal of the second comparator 24 is kept at a second reference potential $E_2$. The charge-discharge circuit 22 and the second comparator circuit 24 constitute a timer means. The output terminal of the second comparator 24 is connected to a second charge-discharge circuit 26 which is constituted by a series connection of a resistor $R_2$ and a capacitor $C_2$. The second charge-discharge circuit 26 is supplied with the voltage Vcc. A voltage across the capacitor $C_2$, that is, an output signal (C) of the second charge-discharge circuit 26 is supplied to a minus input terminal of a third comparator 28. A plus input terminal of the third comparator 28 is kept at a third reference potential $E_3$. The second charge-discharge circuit 26 and the third comparator 28 constitute a second timer means. The output level (D) of the third comparator 28 is coupled to the voltage Vcc via resistor $R_3$. The second and third comparators 24 and 28 preferably have the same construction as the first comparator 20.

Referring now to FIGS. 4A through 4D, the operation of the detection device of FIG. 3 will be described hereinbelow.

When, in operation, the pick-up point P of the pick-up means 14 passes through an intervening region, i.e., a region between two neighboring tracks, the electric signal produced from the pick-up means 14 has a waveform as shown in the lefthand portion of FIG. 4A. As seen from this figure, the peak level of the electric signal occasionally exceeds the first reference potential $E_1$ as long as the pick-up point P locates within the intervening region, whereby the charge-discharge circuit 22 is occasionally discharged by the discharged signal so that the output voltage of the charge-discharge circuit 22 never exceeds the second reference potential $E_2$ as clearly seen from in the lefthand portion of FIG. 4B. In this condition, the charge-discharge circuit 26 is charged up so that the charge-discharge circuit 26 produces an output voltage higher than the voltage $E_3$ as shown in the lefthand portion of FIG. 4C. Thus, the comparator 28 produces a lower level of output signal as shown in the lefthand portion of FIG. 4D, which low level signal indicates that the pick-up point P is located within the recorded region.

When, however, the pick-up point P enters the non-recorded region, the electric signal produced from the pick-up means 14 has a low level voltage as shown in the righthand portion of FIG. 4A, so that the charge-discharge circuit 22 is charged up and produces a voltage higher than the reference potential $E_2$ whereby the comparator 24 causes the charge-discharge circuit 26 to be preferably immediately discharged to produce a lower voltage as shown in the righthand portion of FIG. 4C. At this instant, the comparator 28 produces a higher level of voltage, that is, the detection signal as shown in the righthand portion of FIG. 4D. The detection signal indicates that the pick-up point P is located within the non-recorded region.

It is, in this instance, to be noted that the maximum repetition period of the electric signal (A) wherein the electric signal exceeds the potential $E_1$ when the pick-up point P locates within the intervening region is dependent on the maximum pitch of the information bits in the target track and the relative tangential speed of the pick-up point P with respect to the recording disc. The maximum pitch of the information bits are dependent on manner of modulation of the information signal. When, for example, the information signal is modulated under MFM (Modified Frequency Modulation), the maximum transition period is 2T where T represents the bit cell distance. In view of the above-mentioned maximum repetition period, the time constant of the charge-discharge circuit 22 is selected so that the charge-discharge circuit 22 is charged up to the potential $E_2$ when the electric signal (A) has a level lower than the potential $E_1$ throughout a time period slightly longer than the maximum repetition or transition period, whereby the output voltage of the charge-discharge circuit 26 is immediately reduced to indicate that the pick-up point P has dislocated from the recorded region. It is now clear that the output voltage of the compartor 24 may be utilized as the detection signal indicating that the pick-up point P has dislocated or deviated from the recorded region.

It is, furthermore, to be noted that a full-wave rectifier may be provided at the input terminal of the comparator 20 so as to rectify the electric signal in fullwave, thereby to make it possible to select a small time constant of the first charge-discharge circuit 22. By the provision of the full-wave rectifier, the time-constant of the charge-discharge circuit 22 may be reduced by about a half. When the time constant of the charge-discharge circuit 22 is small, the detection period of the detection circuit is short, which means that the detection circuit is much more quickly responsive.

Even though the reduction of the time constant of the charge-discharge circuit 22 is desirable for shortening the detection period, the possible drop-out phenomenon in reproduction of the recording disc should be, of course, taken into account upon selection of the time constant of the charge-discharge circuit 22.

When the pick-up point P returns into the recorded region from the non-recorded region, the output voltage of the comparator 20 takes a lower level so that the output stage of the comparator 24 immediately becomes open, or OFF, thereby to start the charging of the charge-discharge circuit 26. Upon the lapse of a certain period of time from the return of the pick-up point P to the recorded region, the output voltage of the charge-discharge circuit 26 exceeds the reference potential $E_3$, with the result that the comparator 28 produces the low level voltage indicating that the pick-up point P has returned to the recorded region. The time constant of the second charge-discharge circuit 26 should be selected in view of noises caused by possible defects on the recording surface or dusts adhered onto the recording surface within the non-recorded region.

FIGS. 5A through 5D illustrates waveforms of signals appearing in the detection device of FIG. 1 when the pick-up point P passes through such a defect of the recording surface mentioned above.

Figure 5A:
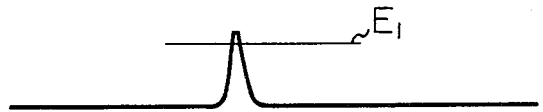
FIGS. 5A through 5D are diagrams showing waveforms of signals appearing in the circuit of FIG. 3, when the pick-up point passes a defective portion of a nonrecorded region on the recording disc.
Figure 5B:
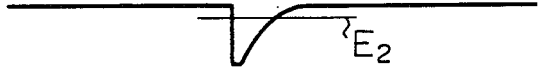
Figure 5C:
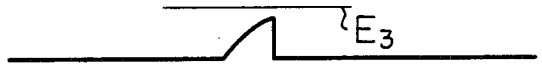
Figure 5D:

When, for example, the electric signal from the pick-up means 14 has a peak voltage exceeding the reference potential $E_1$ due to the defect as shown in FIG. 5A, the comparator 20 makes the charge-discharge circuit 22 immediately discharge when the peak voltage of the electric signal exceeds the reference potential $E_1$, so that the output terminal of the comparator 20 is kept at a low level when the electric signal exceeds the reference potential $E_1$ and thereafter becomes free from any potential (collector open condition), thereby the charge-discharge circuit 22 is discharged when the peak level of the electric signal exceeds the reference potential $E_1$ and thereafter charged up. Thus, the output voltage of the charge-discharge circuit 22 has a waveform as shown in FIG. 5B. When the minus input of the comparator 24 is lower than the reference potential $E_2$, the output terminal of the comparator 24 is open so that the capacitor $C_2$ is charged. However, the time period when the minus input is lower than the reference potential $E_2$ is too short to allow the output voltage of the charge-discharge circuit 26 to exceed the reference potential $E_3$ as shown in FIG. 5C, whereby the output voltage of the comparator 28 is kept at high level indicating that the pick-up point P is still located within the non-recorded region.

FIG. 6 shows another detection device according to the present invention which has the same construction as that of FIG. 1 except that a retriggerable monostable multivibrator 30 and a buffer amplifier 32 are used instead of the charge-discharge circuit 22 and the comparator 24. The retriggerable monostable multivibrator 30 has the same time constant as the charge-discharge circuit 22. The comparator 20 has an open collector output stage and the output terminal is pulled up to the voltage Vcc by means of a pull-up resistor $R_4$.

When, in operation, the pick-up point P locates within the recorded region and especially the intervening region the electric signal has a waveform as shown by the lefthand portion of FIG. 7A so that the output signal of the comparator 20 has a waveform as shown in the lefthand portion of FIG. 7B. In other words, the output voltage of the comparator 20 has a low level when the peak level of the electric signal exceeds the reference potential $E_1$. Since the retriggerable monostable multivibrator 30 has the same time constant as that of the charge-discharge circuit 22, the monostable multivibrator 30 continues its quasi-stable state thereby to produce a high level of output voltage as shown in the lefthand portion of FIG. 7C, whereby the output voltage of the comprator 28 takes a low level L as shown in FIG. 7D as long as the pick-up point locates within the recorded region.

When, however, the pick-up point P dislocates from the recorded region, the electric signal from the pick-up means 14 takes a low level as shown in the righthand portion of FIG. 1, the comparator 20 produces a high level of output voltage as shown in the righthand portion of FIG. 7B, so that the multivibrator 30 returns to its stable state and produces a low level of output voltage as shown in the righthand portion of FIG. 7C whereby the output voltage of the comparator 28 takes a high level H as shown in FIG. 7D.

It is, in this instance, to be understood that the output voltage of the monostable multivibrator 30 may be used as a detection signal indicating the dislocation of the pick-up point from the recorded region when it is not required to detect the return of the pick-up point into the recorded region from the non-recorded region within any possible erroneous operation due to defects or the like on the recording surface.

As seen from the above-description, the detection device according to the present invention can precisely detect the dislocation of the pick-up point of the pick-up means from the recorded region on the recording disc with simple constructions.

It will be understood that the invention is not to be limited to the exact construction shown and described and that various changes and modifications may be made without departing from the spirit and scope of the invention, as defined in the appended claims.

What is claimed is:

1. A detection device for detecting dislocation of a pick-up point of pick-up means incorporated in a disc player from a recorded region of a recording disc being played back in the disc player, said recording disc carrying on the recording surface thereof a track signal in the form of one or more circumferentially extending tracks which define said recording region, said pick-up means being positioned in the proximity of said recording surface of said recording disc for producing an electric signal containing said track signal while aligning said pick-up point onto a target track under the tracking servo control of said disc player, which comprises:

comparing means for comparing the intensity of said electric signal with a first reference level and for producing an output signal when the intensity of said electric signal falls below said first reference level; and timer means for producing a dislocation signal when said output signal lasts longer than a first predetermined time period, said dislocation signal indicating dislocation of said pick-up point from said recorded region.

2. A detection device according to claim 1, in which said first reference level is established by a voltage source producing a voltage which is slightly lower than a predetermined minimum amplitude of said electric signal, said minimum amplitude electric signal being generated by said pick-up means when said pick-up point is located within an intervening region between two neighbouring ones of said tracks.

3. A detection device according to claim 1 which includes a full-wave rectifier provided at the input of said comparing means, and the input of said rectifier supplied with said electric signal.

4. A detection device according to claim 1 or 2, in which said first predetermined time period is related to the maximum transition period of said electric signal.

5. A detection device according to claim 3, in which said first predetermined time period is related to a half of the maximum transition period of said electric signal.

6. A detection device according to claim 1 or 3 in which said comparing means is a first comparing means and said timer means includes:
 a first charge-discharge circuit coupled to the output of said first comparing means for producing a first charged voltage in response to said output signal; and
 a second comparator means for comparing said first charged voltage with a second reference level and for producing said dislocation signal when said first charged voltage exceeds said second reference level.

7. A detection device according to claim 1 or 3, in which said timer means includes:
 a retriggerable monostable multivibrator which returns to the stable state when said output signal lasts longer than said first predetermined time period.

8. A detection device according to claim 1 wherein said timer means is a first timer means and which further comprises:
 a second timer means coupled to said first timer means for producing a return signal upon the lapse of a second predetermined time period from disappearance of said dislocation signal.

9. A detection device according to claim 8, wherein said comparing means is a first comparing means, and in which said second timer means includes:
 a second charge-discharge circuit coupled to said first timer means for producing a second charged voltage in response to said dislocation signal; and
 a second comparator for comparing said second charged voltage with a third reference level and for producing said return signal when said second charged voltage exceeds said third reference level.

* * * * *